(12) United States Patent
Videlov

(10) Patent No.: US 8,554,878 B2
(45) Date of Patent: *Oct. 8, 2013

(54) METHOD AND A SYSTEM FOR INCORPORATING RELIABLE MESSAGING IN WEB SERVICES CLIENT APPLICATIONS VIA AN API

(75) Inventor: Vladimir E. Videlov, Sofia (BG)

(73) Assignee: SAP AG, Walldorf (DE)

( * ) Notice: Subject to any disclaimer, the term of this patent is extended or adjusted under 35 U.S.C. 154(b) by 1113 days.

This patent is subject to a terminal disclaimer.

(21) Appl. No.: 11/751,490

(22) Filed: May 21, 2007

(65) Prior Publication Data

US 2008/0295117 A1    Nov. 27, 2008

(51) Int. Cl.
 *G06F 13/00*    (2006.01)
(52) U.S. Cl.
 USPC .......................................... 709/219; 719/328
(58) Field of Classification Search
 None
 See application file for complete search history.

(56) References Cited

U.S. PATENT DOCUMENTS

| 7,971,209 B2* | 6/2011 | Eberlein et al. ............... 719/328 |
| 2003/0221000 A1* | 11/2003 | Cherkasova et al. .......... 709/224 |
| 2006/0195476 A1* | 8/2006 | Nori et al. ................. 707/104.1 |

OTHER PUBLICATIONS

Chris Ferris et al, "Implementation strategies for WS-ReliableMessaging", May 5, 2003, IBM.*
Davis, Doug; Karmarkar, Anish; Pilz, Gilbert; Yalcinalp, Umit; "OASIS Web Services Reliable Messaging Policy Assertion (WS-RM Policy) Committee Draft 03," Mar. 14, 2006, pp. 1-15.*
Davis, Doug; Karmarkar, Anish; Pilz, Gilbert; Yalcinalp, Umit; "OASIS Web Services Reliable Messaging Policy Assertion (WS-RM Policy) Committee Draft 04," Aug. 11, 2006, pp. 1-18.*

* cited by examiner

*Primary Examiner* — Azizul Choudhury
(74) *Attorney, Agent, or Firm* — Blakely Sokoloff Taylor & Zafman, LLP

(57) ABSTRACT

A method and a system that incorporate Web services reliable messaging in a Web services client application via an application programming interface (API). The method includes obtaining a Web services proxy object from the client application and using this object for creation of a logical sequence from a sequence factory. The Web services client application transmits a reliable message sequence to the Web services provider based on the logical sequence.

9 Claims, 5 Drawing Sheets

METHOD AND A SYSTEM FOR INCORPORATING RELIABLE MESSAGING IN WEB SERVICES CLIENT APPLICATIONS VIA AN API

BACKGROUND

1. Field of Invention

Embodiments of invention relate generally to the software arts, and, more specifically, to a Web services (WS) reliable messaging application programming interface (API) to incorporate reliable messaging in a Web services client application.

2. Background

The term "Web services" is understood to mean a standards-based, service oriented architecture (SOA) than can be used to engage in business relationships (e.g., buying and selling) in a partially or wholly automated fashion over a public network such as the Internet ("the Web"). Standards bodies and interoperability organizations that have contributed to the Web services effort include the World Wide Web Consortium (W3C), the Organization for the Advancement of Structured Information Standards (OASIS), the Internet Engineering Task Force (IETF) and the Web Services Interoperability Organization (WS-I).

Web services are services (usually including some combination of programming and data, but possibly including human resources as well) that are made available from a business's Web server for Web users or other Web-connected programs. Providers of Web services are generally known as application service providers. Web services range from such major services as storage management and customer relationship management (CRM) down to much more limited services such as the furnishing of a stock quote and the checking of bids for an auction item. The accelerating creation and availability of these services is a major Web trend.

Users can access some Web services through a peer-to-peer arrangement rather than by going to a central server. Some services can communicate with other services and this exchange of procedures and data is generally enabled by a class of software known as middleware. Services previously possible only with the older standardized service known as Electronic Data Interchange (EDI) increasingly are likely to become Web services. Besides the standardization and wide availability to users and businesses of the Internet itself, Web services are also increasingly enabled by the use of the Extensible Markup Language (XML) as a means of standardizing data formats and exchanging data. XML is the foundation for the Web Services Description Language (WSDL).

As Web services proliferate, concerns include the overall demands on network bandwidth and, for any particular service, the effect on performance as demands for that service rise. A number of new products have emerged that enable software developers to create or modify existing applications that can be "published" (made known and potentially accessible) as Web services.

With Web services, the world is divided into providers and consumers. The Web service provider develops a Web service in a certain programming language and deploys it to its own server runtime environment. The service is described in the Web Services Description Language (WSDL) using special XML tags. The service description is published in a common service directory. Web services directories are generally organized following the UDDI specification. Major software vendors such as SAP, Microsoft, and IBM operate their own public UDDI directories. A developer on the Web service consumer (client) side can browse the UDDI directory and look for applicable services. The consumer may then download the WSDL of a selected Web service and trigger the execution of the Web service over the communication link that is established between the consumer and the provider. Web service invocations are standardized using SOAP, while a SOAP request contains the name of the Web service plus its actual parameters. A SOAP response contains the result parameters based on the signature that is exposed in the WSDL. Note that in a Web service scenario, the use of the directory is optional; if you know where a Web service runs and you obtain the description directly from the Web service provider, you can invoke the Web service without using the directory.

Consuming services essentially involves some client application that is interested in invoking the functionality exposed by the service. Services may be consumed by some other Service implementation, or by a composite application that invokes a series of services or even directly from a User Interface. In the Web services world, it does not matter where the Service is invoked from. The wire format of the Service messages, the Service behavior, and so on, are not specific to the environment from which the Service is invoked.

Sun's JAX-RPC specification supports a client programming model where the client can be programmed directly against the Service interface. The client is provided with Service proxy objects that support the exactly same interface as the actual Service. The proxy object encapsulates many gory details related to data binding, network address of the Service, transport protocol handling, etc, and gives an illusion of the Service being local to the client.

The proxy objects in J2SE applications are like any other Java objects. However in the case of J2EE, which is a managed environment, proxy objects can be administered and made accessible to client applications via Java Naming and Directory Interface (JNDI). The Web services for J2EE (JSR 109) specification defines clearly the programming, packaging and deployment model for clients in a J2EE environment.

Behind the scenes, the proxy object must deal with the wire level messages that map to the Java data structures. In some situations, even the client program itself needs to directly manipulate the message. Web services use SOAP as the neutral wire format for Service messages. In the Java world, SOAP with Attachments API for Java (SAAJ) provides a Java object model for different parts of SOAP messages, and an API for accessing the same.

As the core Web services specifications (WSDL, SOAP and UDDI) are maturing and being adopted, new Web services specifications are emerging to fulfill the enterprise application and quality of service requirements, for example: Web services Security, Web service Business Process Execution Language, Web service Policy, and Web services Notification. Corresponding technologies in Java are expected to follow suit. An example of such an effort is JSR 208, which aims at standardizing a Java-based plug and play framework where components from different vendors that offer business integration functionality via Web services can coexist.

SUMMARY OF THE INVENTION

A method and system of providing an application programming interface (API) to send Web services reliable messages (WS-RM API) from a Web services client application to a Web services provider is described. The method includes obtaining a Web services proxy object from a client application and using this object to create a logical sequence from a sequence factory. The Web services client application transmits a reliable message sequence to the Web services provider based on the logical sequence.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

Figure 1:
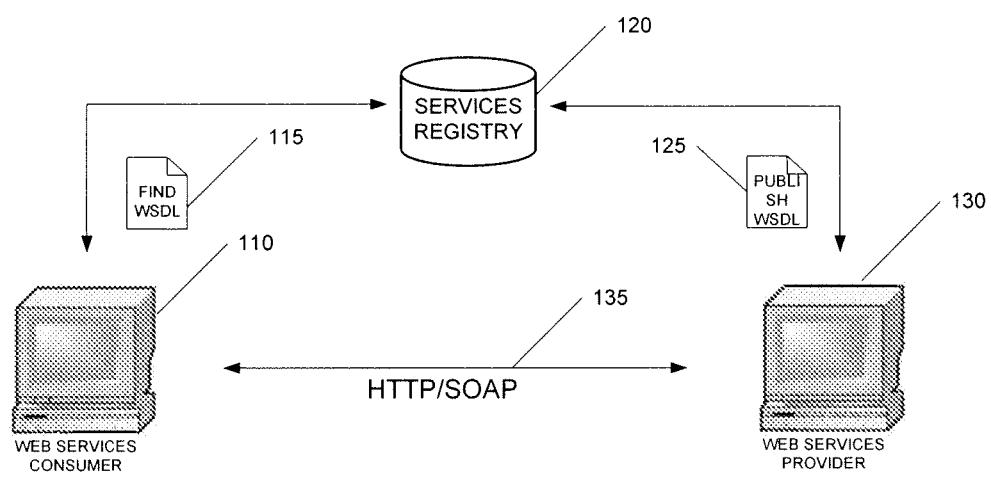
FIG. 1 is a diagram of a system in which an embodiment of the invention may be implemented.

FIG. 1 is a diagram of a system in which an embodiment of the invention may be implemented. Web services model 100 that includes a services registry 120, a service provider 130 and a service consumer 110. The service consumer 110, or "service requester", is generally understood to be an entity that seeks and (in cases where a suitable Web service is found) uses a particular Web service through a network 135. The registry 120 includes listings of various "available" services, and, may assist the service consumer 110 in searching for a suitable service provider based on the web servicing needs of the service consumer 110. A service provider 130 is the provider of one or more Web services that can be accessed over the network 135. Because of the vast expanse of the Internet and interest in automated business engagements, many registries, service consumers and service providers may be in operation at any instant of time.

The services registry 120 may be defined in accordance with Universal Discovery, Description and Integration (UDDI) specifications provided by uddi.org. Besides providing listings of available services, a UDDI registry may also make available to a service consumer additional details that pertain to any particular Web service such as: 1) the location of the Web service (e.g., its URI specified by a specific network destination address or name); 2) the capabilities of the Web service (e.g., specific methods that are supported by the Web service and that may be called upon by the service consumer), and, 3) communication semantics needed for invoking the Web service through the network (e.g., the structure of a messaging format and/or protocol needed to properly communicate with the Web service).

According to one widely adopted approach, such "additional details" are described in Web Services Directory Language (WSDL) text documents written in eXtensible Markup Language (XML). Here, for example, for each Web service that the registry 120 maintains a listing of, the registry 120 also maintains a WSDL document that describes the location, capabilities and communication semantics of the Web service. Presently, a WSDL document for a particular Web service is expected to include an "abstract interface" description of the Web service (which includes the Web service's methods and the data passed between the Web service provider and Web service consumer) and a "concrete implementation" description of the Web service (which includes specific protocol and data format specifications for communicating with the Web service (referred to as a "binding") and the location of the Web service (referred to as a "port")).

According to another widely adopted approach, with respect to the actual communication that occurs between the service consumer 110 and the service provider 130, such communication is implemented through an exchange of Simple Object Access Protocol (SOAP) text messages written in XML. A SOAP message is viewed as being contained within an envelope that further contains a header (which may be optional) and a body.

For a particular Web service, the header is typically used to pass "control" information associated with the consumer's Web service engagement with the Web service provider (e.g., information used for performing encryption/decryption and/or signature checking, information used to ensure proper ordering of SOAP messages, information that identifies the ultimate destination of the SOAP message, etc.). The body is used to pass more "substantive" information associated with the service consumer's Web service experience (e.g., a specific method call from the service consumer to the service provider, or, a specific response generated by the service provider in response to a specific method call).

In basic cases where a service provider 130 receives a SOAP message sent by a service consumer 110, or, where a service consumer 110 receives a SOAP message sent by a service provider 130, the body of the SOAP message essentially represents the purpose of the communication between the service provider 130 and service consumer 110. For instance, in the case of a SOAP message being sent by a service consumer 110 and received by a service provider 130, the purpose of the SOAP message may be that the service requester 110 desires that the service provider 130 performs a specific method. In this case, the body of the SOAP message is apt to contain both a request to perform the specific method and any input parameters that are both needed by the method and determined by the service requester 110.

The Web services architecture has evolved into a scheme that supports "extensions" to the SOAP messaging format that are available if desired, but, are not required to be SOAP compatible.

For instance, consistent with the description provided in the paragraph just above the immediately preceding paragraph: 1) a "WS-Security" extension has been defined that specifies information to be contained within a SOAP message header if encryption/decryption and/or authentication procedures are to be performed upon a SOAP message; 2) a "WS-Reliable Messaging" extension has been defined that specifies information to be contained within a SOAP message header if proper ordering of SOAP messages is desired; and, 3) a "WS-Addressing" extension has been defined that specifies information to be contained within a SOAP header that describes the destination of the SOAP message in a transport independent fashion.

WS-Reliable Messaging Protocol

Transactions across a network (including local area networks (LANs) and the Internet) from a source endpoint to a destination endpoint may be disrupted including messages being lost, corrupted, duplicated, and/or received out-of-order. While the factors causing these disruptions are beyond the scope of this document these disruptions still need to be handled effectively and efficiently in Web services systems. A standard Web Services Reliable Message Protocol specification (WS-Reliable Messaging) has been authored to fulfill these needs and serves as a building block for varying Web services implementations. In addition to providing for reliable message transactions, the WS-Reliable Messaging specification allows for different Web services implementations to interact with each other (for example, this allows for communication between Java implementations and NET implementations).

During execution of any WS-Reliable Messaging protocol, an identifier for the group of messages to be transmitted between the source and destination is applied to each message. This identifier is referred to as the sequence identifier (sequence ID). The sequence ID uniquely identifies the group of messages transactions. The sequence ID is used because at any given point in time an endpoint may have more than one group of messages being received or sent. Almost all of the messages transmitted using WS-Reliable Messaging use a sequence identifier (the exception being the first message sent from the source that requests a sequence ID from the destination). Each reliable message sent from the source also includes a message (or sequence) number. This number is used to determine what order of the messages received should be in and/or to determine if all of the messages have been received. Messages are sent one at a time from the source to the destination endpoint.

A few conditions are to be adhered to according to the current common specification. These conditions include: 1) the source must have an endpoint reference that uniquely identifies the destination endpoint; 2) the source must have knowledge of the destination's policies and be capable of adhering to these policies; 3) if secure exchange is required, both the source and destination must have the appropriate security capabilities; 4) the source must assign each reliable message a sequence number; and 5) every acknowledgement issued by the destination must include a sequence number range of every message successfully received and exclude sequence numbers not yet received.

As described above, the stateless reliable messaging protocol has a standard interface that essentially "hides" from other applications the changes to the content of the WS-Reliable Messaging specification information that may evolve over time. That is, the stateless reliable messaging protocol may be re-designed if necessary to adapt to changes made to the applicable specifications that define the content of the WS-Reliable Messaging common specification, while, maintaining at the interface methods that may be invoked by legacy software applications.

Embodiments of the present invention describe an API to incorporate Web services reliable messaging (WS-RM) in a Web services client application. The WS client application is developed on the client side of a client-server communication, which is represented as the WS consumer 110 of FIG. 1. In some embodiments, the client application may be written in any software language, as the WS functionality is language and platform independent.

Figure 2:
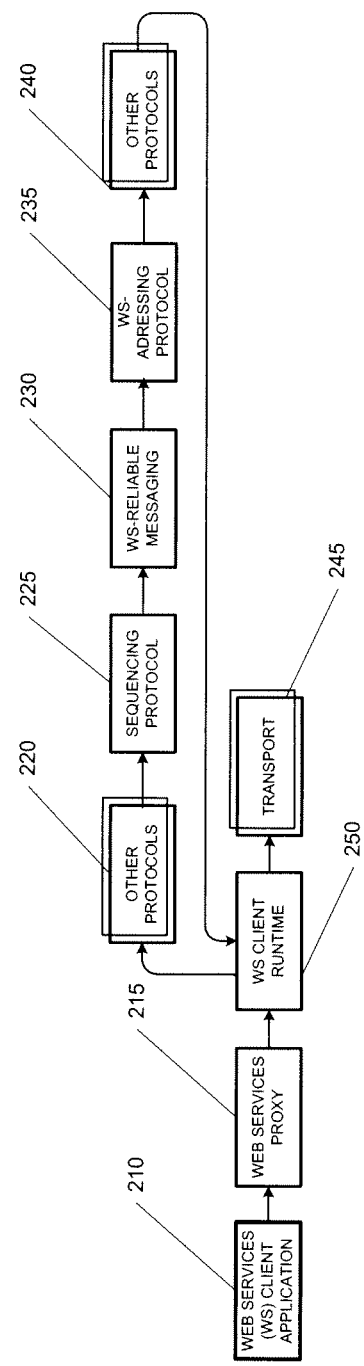
FIG. 2 is a block diagram of a protocol chain executed by Web services runtime framework in one embodiment of the invention.

FIG. 2 is a block diagram of a protocol chain executed by Web services runtime framework in one embodiment of the invention. A WS client application 210 invokes a WS proxy 215, which is generated on a base of a provided WSDL file of a Web service. The WSDL file may be provided by a services registry 120 or directly by the WS provider that hosts the given Web service. The generation of the WS proxy 215 is performed in a development environment (for example, SAP NetWeaver Developer Studio available from SAP AG of Waldorf, Germany). The WS proxy 215 invokes a WS client runtime 250, which processes the message defined in the client application using a plurality of protocols and forwards it to a transport layer 245. The WS client runtime 250 invokes all WS related protocols including, but not limited to, Sequencing Protocol 225, WS-Reliable Messaging 230, and WS-Addressing 235. The protocols modify the message by adding new information in the header of the message.

The Sequencing Protocol enables the application to work with logical sequences. The WS-Reliable Messaging allows messages to be delivered reliably between distributed applications notwithstanding software component, system, or network failures. The WS-Addressing protocol defines the message's destination endpoint and sender endpoint. For instance, in the case of a message being sent from a Web service consumer to a Web service provider, the sender endpoint reference identifies the Web service consumer and the destination endpoint reference identifies the Web services provider. In the case of a SOAP message, the endpoint references may be written in XML in the header of the SOAP message.

A Web service endpoint is the portion of the service provider's software that is responsible for comprehending the received message's body and taking appropriate action in response (e.g., performing some act and then generating the body of a "response" message that is to be sent to the sender of the message). Thus, a Web service's substantive processes (i.e., those relating to the body of its message) are essentially defined by its endpoint's methods. A Web service's endpoint may correspond to a Java servlet or Enterprise Java Beans (EJB).

After the message is modified by the protocols layer in the WS runtime on the client side, it is then forwarded to the transport layer 245, which transmits the message to the WS provider 130 via HTTP/SOAP transport protocols 135.

Figure 3:
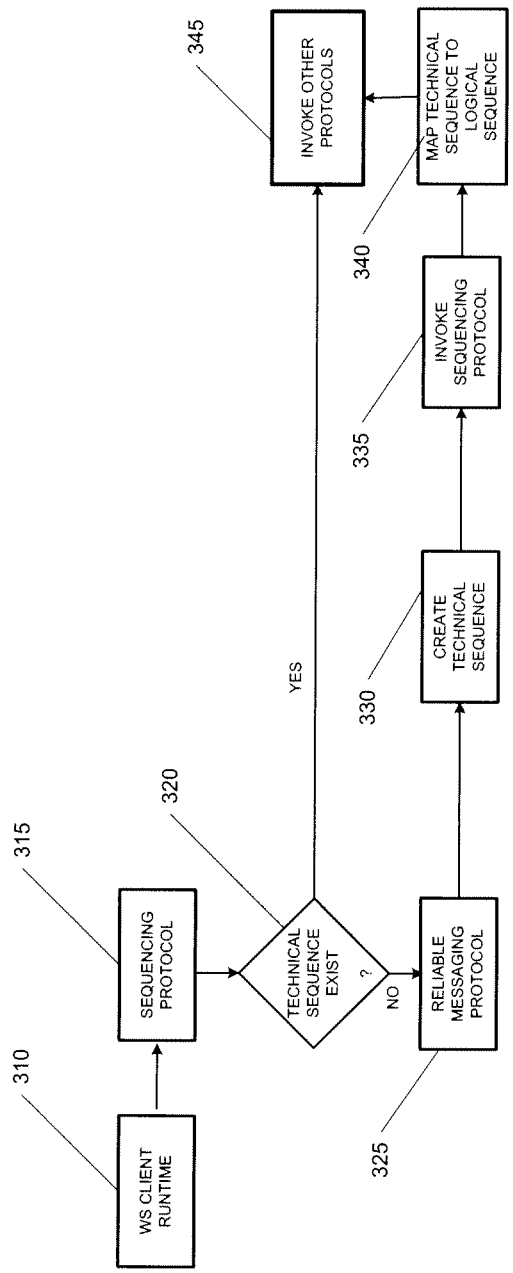
FIG. 3 is a block diagram of an extension to the protocol chain described in FIG. 2.

FIG. 3 is a block diagram of an extension to the protocol chain described in FIG. 2. When the WS runtime 310 invokes the Sequencing Protocol 315, it checks if for each logical sequence there is a reliable message (technical) sequence 320. If there is not, then the Sequencing Protocol invokes the Reliable Messaging protocol 325, which creates a technical sequence 330. After the technical sequence is created, then the WS runtime invokes the Sequencing protocol 335 to map the technical sequence to the logical sequence 340. In this way, logical sequences are associated with technical sequence and the application developers by managing the logical sequences actually manage the technical sequences. After the sequence is mapped, the Web services runtime invokes other protocols from the chain 345. If there was a technical sequence when the Sequencing Protocol performed the check, then the Web services runtime directly invokes the other protocols from the chain 345.

Figure 4:
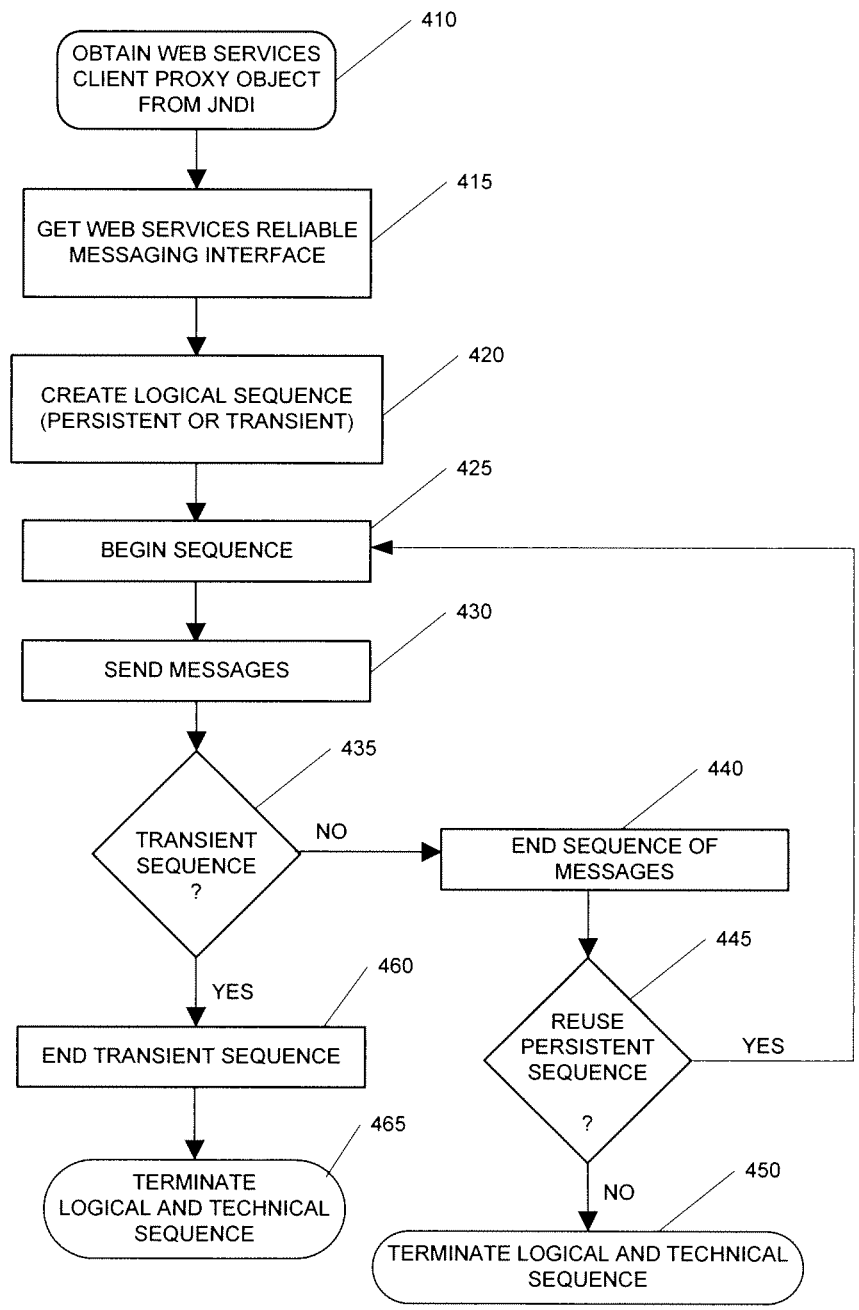
FIG. 4 is a block diagram of a process of creating and managing logical sequences according to one embodiment of the invention.

FIG. 4 is a block diagram of a process of creating and managing logical sequences according to one embodiment of the invention. The method begins with obtaining the Web services client proxy object from Java Naming and Directory Interface (JNDI) 410. The JNDI is an API specified in Java technology that provides naming and directory functionality to applications written in the Java programming language. It is designed especially for the Java platform using Java's object model. Using JNDI, applications based on Java technology can store and retrieve named Java objects of any type. In addition, JNDI provides methods for performing standard directory operations, such as associating attributes with objects and searching for objects using their attributes. During creation of the Web services proxy such object is created and associated with specific attributes including, but not limited to, a name with which it is bound in the naming system (e.g., JNDI). The object can be accessed through lookup operations as specified in the JNDI specification. In this way, the Web services proxy object is obtained from the JNDI.

In one embodiment, the WS proxy object is used to get WS-RM API 415. In this way, the WS client application can use and work with the methods defined in the WS-RM interface. Embodiments of the present invention include creating a logical sequence of messages 420. The logical sequence is an abstract sequence of messages that has a specific type and length defined in the client application. The application developer is provided with the possibility to work with logical sequences instead of technical sequences, which are created by the WS-RM protocol and are also called "reliable message sequences"; this is to manage the sequences of messages and their sending at application level. The Web services runtime maps the logical sequences with the technical sequences. In one embodiment of the present invention a logical sequence may have more than one technical sequence underneath during its lifetime. But only one active technical sequence, defined at the WS-RM protocol, can exist at a time. Therefore, when the technical sequence expires or has to be terminated, a new one will be constructed and mapped to the logical sequence. The logical sequence is transmitted through the transport layer 325. There the logical sequence can be a transient sequence or a persistent sequence. The transient sequence may have zero or one technical sequence and its lifetime is controlled by the Web services runtime. The WS runtime terminates the sequence after the last acknowledgement is received. The persistent sequence may have zero or many technical sequences mapped. Its lifetime is controlled by the client application, which means that the application developer determines the length of the sequence and when to terminate it.

After the logical sequence is created 420, the process continues with a begin sequence method 425 that indicates the beginning of the sequence. The method of the present invention further continues with send messages 430 and end sequence, wherein the last step indicates the end of the sequence. If the logical sequence that is created is a transient sequence 435, then the end transient sequence 460 operation ends the logical sequence and terminates the mapped technical sequence 465. In this case, the terminate operation is performed by the WS runtime and it is not specified in the client application. If the logical sequence that is created is a persistent sequence, then the end sequence 440 operation only ends the current sequence, it does not end the logical sequence, or the technical sequence. In one embodiment of the invention, the application developer may want to create a new sequence of messages into the logical sequence. This is not a new logical sequence, it is a new grouping of messages in a sequence in the logical sequence. In one persistent logical sequence, there may be more than one sequence. In this case, the method further continues with reuse persistent sequence 450, which allows the application to begin a new sequence 425. The process again executes send messages 430 and end sequence 440 operations. If no more sequences are to be created in the logical sequence, then the application terminates the logical sequence and the mapped technical sequence 450. If the technical sequence is expired or self-terminated during usage of the logical sequence, a new technical sequence will be created. The client application explicitly and permanently terminates the logical and the corresponding technical sequence with the "terminate" method. If only "begin", "end" and "reuse" operations are performed on the logical sequence, the technical sequence below stays open.

Figure 5:
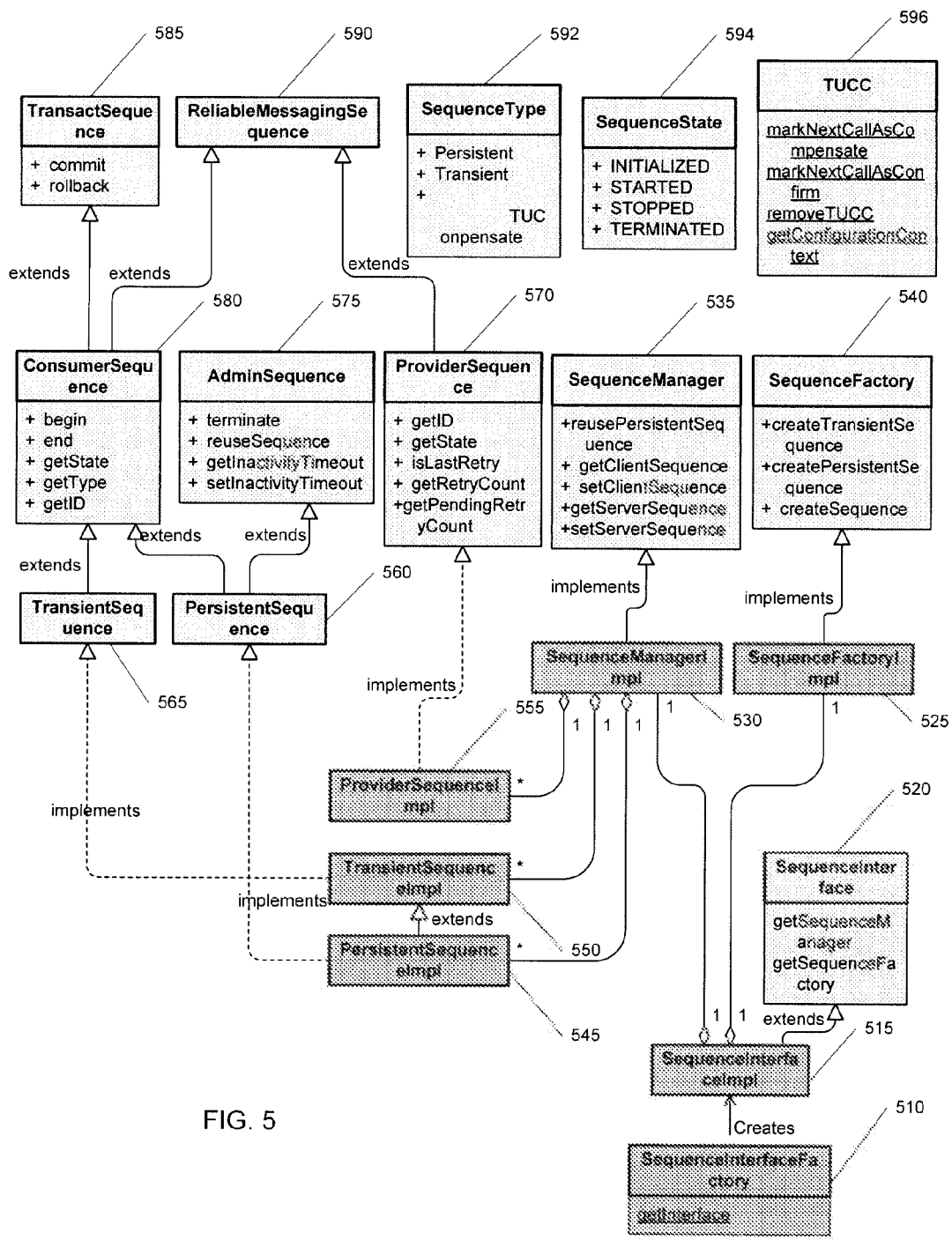
FIG. 5 is a relational diagram of WS-RM API of one embodiment of the invention.

FIG. 5 is a relational diagram of WS-RM API of one embodiment of the invention. This API provides different classes, interfaces, and methods for managing logical sequences. SequenceInterfaceFactory 510 is a class that creates an object of SequenceInterfaceImpl 515 class, which implements SequenceInterface 520 interface and its methods: getSequenceManager and getSequenceFactory. The created object contains two objects—an object of SequenceManagerImpl 530 class and an object of SequenceFactoryImpl 525 class. The SequenceManagerImpl 530 class implements SequenceManager 535 interface that includes the following methods: 1) "reusePersistentSequence" that enables reuse of a created persistent logical sequence defined with "begin" and "end" operations; 2) "getClientSequence" that returns a client sequence object, which can be a transient or persistent sequence; 3) "setClientSequence" that sets the client sequence object to another object; 4) "getServerSequence" that returns a server sequence object, which again can be a transient sequence or a persistent sequence; and, 5) "setServerSequence" that sets the server sequence object to another object. The SequenceFactoryImpl 525 class implements SequenceFactory 540 interface that provides the application developer with an ability to create different types of logical sequences. In one embodiment, the SequenceFactoryImpl 525 includes the following methods: 1) "createTransientSequence" that creates transient logical sequences; 2) "createPersistentSequence" that creates persistent logical sequences; and, 3) "createSequence" that specifies a type of the logical sequence.

The object of the SequenceManagerImpl 530 class contains from zero to many objects of the following classes: ProviderSequenceImpl 555, TransientSequenceImpl 550, and PersistentSequenceImpl 545. The ProviderSequenceImpl 555 class is to be implemented on the Web services server side; it provides information about the logical sequences that are received from the client side.

The ProviderSequenceImpl 555 class implements ProviderSequence 570 interface that includes the following methods: 1) "getID" that gets the ID of the sequence; 2) "getstate" that gets the state of the sequence (for example, started, stopped, terminated); 3) "isLastRetry" that specifies if this is the last attempt at invoking a Web service endpoint; 4) "getRetryCount" that specifies the number of attempts of invoking a Web service endpoint; and, 5) "getPendingRetryCount" that specifies the number of attempts of invoking a Web service endpoint that are pending.

The TransientSequenceImpl 550 class implements TransientSequence 565 interface that extends ConsumerSequence 580 interface, which extends TransactSequence 585 interface and ReliableMessagingSequence 590 interface. This means that the TransientSequenceImpl 550 class can implement the methods of these interfaces. The ConsumerSequence 580 interface includes the following methods: 1) "begin" that indicates the beginning of a logical sequence; 2) "end" that indicates the end of a logical sequence; 3) "getState" that gets the state of the sequence (for example, "started", "stopped", "terminated"—these constants are defined as static fields in the SequenceState class); 4) "getType" that gets the type of the logical sequence (for example, "persistent"); and, 5) "getID" that gets the ID of the sequence. The TransactSequence 585 interface includes the following methods: 1) "commit" that specifies that all messages will be handed over to the WS-RM protocol; and, 2) "rollback" that specifies that all messages will be discarded. All these operations can be applied to transient and persistent sequences. The word "operation" in this document has the same meaning as the word "method" in the software art.

The PersistentSequenceImpl 545 class implements PersistentSequence 560 interface that extends ConsumerSequence 580 interface, which extends TransactSequence 585 interface and ReliableMessagingSequence 590 interface, and AdminSequence 575 interface. This means that the PersistentSequenceImpl 545 class can implement the methods of these interfaces. The AdminSequence 575 interface includes the following methods: 1) "terminate" that terminates a technical sequence mapped to a specific logical sequence after ending the said logical sequence; 2) "reuseSequence" that enables reuse of a created persistent logical sequence defined with "begin" and "end" operations; 3) "getInactivityTimeout" that returns an inactivity interval for a sequence, if in this interval the sequence is not used, then the sequence expires; and, 4) "setInactivityTimeout" that sets an inactivity interval for a sequence. All these operations can be applied to persistent sequences only.

All three classes, ProviderSequenceImpl 555, TransientSequenceImpl 550, and PersistentSequenceImpl, implement indirectly the ReliableMessagingSequence 590 interface, which contains no methods. This interface is part of the API to include any future operations that will be valid for all sequences.

The system of the present invention also includes helper static classes. A static class is a class that exists without having to be allocated. In other words, it is created before the "main" method is called. That means the methods for the class can be accessed by any other method in the program. The system includes the following static classes: SequenceType 592, SequenceState 594, and TUCC 596.

The SequenceType 592 static class specifies the type of the logical sequences. It contains the following constants: "Persistent", "Transient", and "TUCompensate". The TUCompensate constant specifies that this sequence is provided with a Tentative Update, Compensate & Confirm (TUCC) feature. The TUCC provides functions to persist a message from an application transaction in a persistence storage unit, forward the message as a reliable message to the transport layer of the Web services framework, and confirm the received message at the transport layer.

The SequenceState 594 class specifies the state of the logical sequence, it includes the following constants: 1) "INITIALIZED" specifies that the sequence is created; 2) "STARTED" specifies that the sequence is started and messages are in process of adding; 3) "STOPPED" specifies that the sequence is stopped by an "end" operation; and, 4) "TERMINATED" specifies that the technical sequence is terminated. The TUCC 596 static class (Tentative Update, Compensate & Confirm) includes the following methods: 1) "markNextCallAsCompensate" that marks the first message of a sequence as a compensate message, this means that the message will be persisted in a persistent storage unit; 2) "markNextCallAsConfirm" that marks the message as confirmed and deletes the reversion message from the persistent storage unit; 3) "removeTUCC" removes the TUCC feature from the sequence; and, 4) "getConfigurationContext" that returns a configuration context object with the message that needs to be transmitted.

Elements of embodiments may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, propagation media or other type of machine-readable media suitable for storing electronic instructions. For example, embodiments of the invention may be downloaded as a computer program, which may be transferred from a remote computer (e.g., a server) to a requesting computer (e.g., a client) by way of data signals embodied in a carrier wave or other propagation medium via a communication link (e.g., a modem or network connection).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

In the foregoing specification, the invention has been described with reference to the specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

The invention claimed is:

1. A processor-implemented method comprising:
    obtaining a Web services proxy object in a Web services client application, the Web services proxy object to define communication protocols for corresponding Web services;
    obtaining a Web services Reliable Messaging (WS-RM) application programming interface (API) via the Web services proxy object;
    creating a logical sequence, from a sequence factory responsive to receipt of the Web services proxy object, the logical sequence to comprise at least one of a persistent sequence or a transient sequence, to include an abstract sequence of messages defined by the Web services client application, to not be transmitted by a WS-RM protocol and to be associated with a technical sequence to be transmitted by the WS-RM protocol; and
    invoking a sequencing protocol via the WS-RM API to
        receive the logical sequence from the client application,
        determine whether the logical sequence is associated with a first technical sequence active for the WS-RM protocol, the WS-RM protocol to have at most one active technical sequence,
        create a second technical sequence to be associated with the logical sequence and active for the WS-RM protocol in response to determining the logical sequence is not associated with the first technical sequence, and
        transmit the technical sequence associated with the logical sequence and active for the WS-RM protocol in accordance with the WS-RM protocol.

2. The method of claim 1, wherein creating the logical sequence from the sequence factory comprises:
    passing the Web services proxy object to an interface factory; and
    receiving an interface to the sequence factory.

3. The method of claim 1 wherein transmitting the technical sequence comprises:
    calling a begin method to initiate transmission of the technical sequence;
    sending the technical sequence; and
    calling an end method to terminate transmission of the technical sequence.

4. The method of claim 3, wherein the logical sequence comprises a persistent sequence and sending the technical sequence comprises sending messages until a terminate method is invoked.

5. The method of claim 4 further comprising:
sending a first message with a first technical sequence;
ending the first technical sequence; and
sending a second message with a second technical sequence, wherein both the first and the second message are part of a same logical sequence.

6. A system comprising:
a processor; and
a Web services client application executed via the processor, the Web services client application to obtain a Web services proxy object that defines communication protocols for corresponding Web services, and to obtain a Web services Reliable Messaging (WS-RM) application programming interface (API) via the Web services proxy object, the Web services client application to further include
a sequence factory to create a logical sequence to comprise at least one of a persistent sequence or a transient sequence, to include an abstract sequence of messages defined by the Web services client application, to not be transmitted by a WS-RM protocol and to be associated with a technical sequence to be transmitted by the WS-RM protocol,
a sequence interface factory to create an interface to the sequence factory responsive to receipt of a Web services proxy object, and
a sequence manager to use the logical sequence to conduct a reliable messaging Web services transaction via the WS-RM API, the transaction including operations to
receive the logical sequence from the client application,
determine whether the logical sequence is associated with a first technical sequence active for the WS-RM protocol, the WS-RM protocol to have at most one active technical sequence,
create a second technical sequence to be associated with the logical sequence and active for the WS-RM protocol in response to determining the logical sequence is not associated with the first technical sequence, and
transmit the technical sequence with the logical sequence and active for the WS-RM protocol in accordance with the WS-RM protocol.

7. The system of claim 6, wherein the sequence factory comprises:
a create sequence method that specifies a type of the logical sequence;
a create transient sequence method; and
a create persistent sequence method.

8. The system of claim 7, wherein each of the transient and persistent sequences comprise:
a begin sequence method;
an end sequence method;
a get sequence state method; and
a get sequence type method.

9. The system of claim 8, wherein the persistent sequence further comprises:
a terminate sequence method; and
a reuse sequence method.

* * * * *